United States Patent [19]

Schwartz et al.

[11] Patent Number: 5,177,632
[45] Date of Patent: Jan. 5, 1993

[54] TRACKING SYSTEM USING A POLYGON OF UNIQUE DIMENSION OR ARBITRARY POLYGON COMBINED WITH SENSORS

[76] Inventors: Nira Schwartz; Arie Shahar, both of 2800 Plaza Del Amo #187, Torrance, Calif. 90503

[21] Appl. No.: 680,306

[22] Filed: Apr. 4, 1991

[51] Int. Cl.$^5$ .............................................. G02B 26/10
[52] U.S. Cl. .................................. 359/216; 359/218; 250/236
[58] Field of Search ............... 359/216, 217, 218, 219, 359/204; 250/234, 235, 236; 358/105, 486; 356/385, 386, 384, 387

[56] References Cited

U.S. PATENT DOCUMENTS

| | | | |
|---|---|---|---|
| 3,602,571 | 8/1971 | Norris, Jr. | 359/216 |
| 3,637,281 | 1/1972 | Gull | 359/219 |
| 4,124,269 | 11/1978 | Beckmann | 359/219 |
| 4,632,503 | 12/1986 | Karlsson | 359/217 |
| 4,674,826 | 6/1987 | Loy | 359/217 |

Primary Examiner—Loha Ben
Attorney, Agent, or Firm—David Pressman

[57] ABSTRACT

A polygon (FIGS. 4 to 6) has unique physical dimensions, i.e., its radius (R8') is correlated to a tracking radius (R13')(where objects are scanned) by a rule which creates an improved linear tracking system with a constant optical path. The polygon is very useful for reading information, writing information, and tracking industrial products on a rotating carousel. When the polygon is mounted on the center of a rotating carousel, with no relative movement between the polygon and the carousel, it can perform accurate linear tracking of objects located on the carousel. The radius of the polygon is equal to half the tracking radius divided by the cosine of an angle of 180/n {Eq. (6)}, where n is an integer. The polygon can have an arbitrary number of sides. Using another method, the non-linearity of the system for an arbitrary polygon's radius can be corrected by a series of sensors [N1 to N4, FIG. 2(a)] positioned at non-linear intervals to trigger a laser beam, creating an effective linear movement of the laser beam on the tracking circumference of scanned objects.

17 Claims, 5 Drawing Sheets

Wc = Omega c

Wp = Omega p
Wc = Omega c

α = Alpha
β = Beta
γ = Gamma
ƺ = Zeta
Θ = Theta

α = Alpha
β = Beta

TRACKING SYSTEM USING A POLYGON OF UNIQUE DIMENSION OR ARBITRARY POLYGON COMBINED WITH SENSORS

CROSS-REFERENCE TO RELATED APPLICATION

The invention of this application is related to the invention of our copending application, Ser. No. 07/660,542, filed Feb. 25, 1991.

BACKGROUND

1. Field of the Invention

The invention relates generally to the field of optics, in particular to optical polygons which are used to manipulate light beams for reading, writing, and inspecting various surfaces.

2. Prior Art

A tracking system such as shown in FIG. 1 is widely used in industry. It comprises a carousel C1 rotating on an axis R7 with spinning objects at its periphery. The objects are in pockets which rotate on axes R1 to R6. During operation, an object (such as a bottle, not shown) is rotated with pocket P1 while a laser beam L1 from a laser L2 engraves the bottle's surface with identifying marking lines, such as a bar code, a lot number, an expiration (pull) date, etc. Such engraving may be done, e.g., to mark the date the bottle was filled with a beverage.

Typically carousel C1 rotates until a pocket with a bottle is adjacent laser L2. Then the carousel stops. The object is continuously rotating about its axis R1 with a constant angular velocity omega p. Laser beam L1 is aligned through the object's rotating axis R1 and along broken line segment between R1 and R13. The engraving on the bottle is linear, i.e., the length engraved is directly proportional to the duration of the engraving.

When engraving is complete, the carousel rotates through a short arc with angular velocity omega c so as to move the bottle in the next pocket P2 to the engraving position, adjacent laser L2, whereupon the carousel stops and the next bottle is engraved in a similar manner. (Engraved bottles are removed from and bottles to be engraved are placed upon the carousel in a continuous manner at another location thereon [not shown] in a known manner.)

Since the carousel must repeatedly start and stop, the number of objects engraved per hour is relatively low.

A way to overcome this start-stop movement of the carousel is to rotate a unique mirrored polygon on the carousel's axis with an angular velocity of one-half the carousel's angular velocity and shine the laser beam on the polygon so that it is reflected onto the bottles. This arrangement is described in our above-referenced copending application. Its advantages include unlimited physical size and the freedom of optical alignment, i.e., the laser beam can hit the polygon at any angle. One disadvantage is that a gear train is required to rotate the polygon relative to the carousel.

Another previously explored way to overcome the start-stop movement was to sue a regular polygon mounted on the carousel's axis. The polygon had twice as many facets as objects on the carousel, and it rotated with an angular velocity equal to one-half of that of the carousel. The results were also unsatisfactory since tracking on the surfaces of the objects was non linear, as shown in FIG. 2(a) I.e., equally spaced beams H1, H2, H3, and H4 aligned towards center R13 of the polygon engraved non-equally spaced marks M1, M2, M3, and M4 on the tracking circumference of radius R13' (In FIG. 2(a) the carousel is not shown and the spinning objects are outside the circumference of the tracking radius). This was especially undesirable if a series of equally spaced marks had to be engraved on the bottle, e.g., to provide a bar code for a supermarket checkout scanner, or for an inspection station for reused bottles.

OBJECTS AND ADVANTAGES

One main object and advantage therefor is to overcome the disadvantages of optical tracking systems which employ a start-stop movement. Another object is to provide a new technique of scanning which employs a unique polygon mounted on a carousel to create a tracking system which does not require start-stop movements, thereby to provide continuous movement of the carousel and larger throughput of tracked objects. Other objects are to simplify the mechanical structure of optical tracking systems which use a gear train to rotate the polygon relative to the carousel. This new technique provides an improved linear tracking system. Optical tracking systems that will track a fixed point on a carousel are easier to build, simpler to activate, and can be implemented on existing carousel designs in a shorter time.

Still other objects are to provide accurate tracking systems for writing, reading, and inspection based on a rotating carousel. Yet other objects are to provide a special system for tracking a fixed point on a carousel using a regular polygon mounted ton a rotating carousel without relative movement between the polygon and the carousel, to provide a tracking system that will have a constant optical path, independent of the angle of rotation of the carousel for maintaining a correct object-polygon-laser position, and to provide a tracking system for an integral number of objects.

Yet other objects are to provide improved linear tracking systems by providing a correction technique for the incident beam, and to create a constant optical path, independent of the angular velocity of the carousel, with a linear displacement of the laser beam or other light sources on the surface of the tracked objects.

Still further objects and advantages will become apparent from a consideration of the ensuing description and accompanying drawings.

SUMMARY

These and other objects are accomplished by using a tracking system composed of a carousel rotating on an axis, and an integral number of pockets spread equally around for holding objects to be tracked. A regular polygon having a number of facets equal to the number of pockets on the carousel is mounted on the rotating axis of the carousel. The polygon is attached to the carousel and moves therewith, i.e., there is no relative motion between the carousel and the polygon. The polygon has a special design, namely a radius having a unique value equal to one-half of the tracking radius divided by the cosine of an angle of 180/n, where n is the number of pockets on the carousel.

In accordance with another aspect of the invention, we employ a polygon with an arbitrary radius with an arbitrary number of objects to be scanned, together with a technique for controlling the timing of triggering the laser beam for writing or triggering the taking of an image. In this way the laser beam will track the surface

DRAWING FIGURES

FIG. 2 (b) is a diagram showing incident and reflected beams related to FIG. 2 (a) in accordance with the invention.

Figure 1:
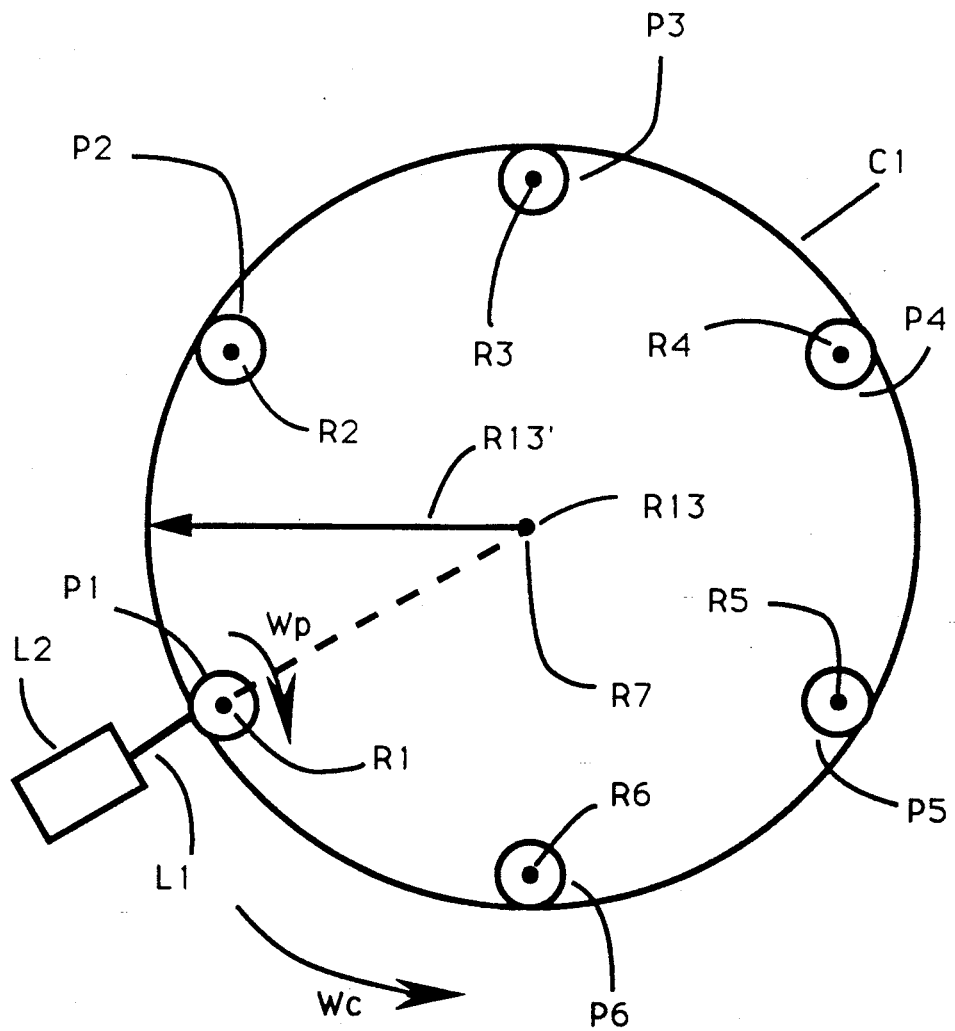
FIG. 1 is a diagram showing a prior-art tracking system using an engraving laser station.

FIG. 1—Prior Art—Tracking System

FIG. 1 shows a basic prior-art tracking system which is widely used in industry. It consists of rotating a carousel C1 with spinning pockets P1 to P6. The carousel rotates on axis R7, and the pockets rotate on axes R1 to R6. A bottle or other object to be currently engraved is rotating within pocket P1, while laser beam L1 engraves its rotating surface, The rotating surface of the bottle lies on a tracking circle having a radius R13'. Each of the bottles is engraved in turn when it is moved in front of the laser by the carousel. The bottles rotate around their own axes with each having an angular velocity omega p.

The carousel rotates until a bottle is adjacent laser L2. Then the carousel stops, i.e., its angular velocity omega c equals zero. At that point the only movement is the bottle rotating at a constant velocity of rotation omega p, as laser beam L1 engraves the bottle. If a series of equally spaced bars are to be engraved on the bottle, since omega p is constant, the laser simply emits a beam at equally spaced intervals as the bottle rotates. During each beam the laser light passes through focusing hardware to form a vertical bar, in accordance with well-known techniques.

Figure 2A:
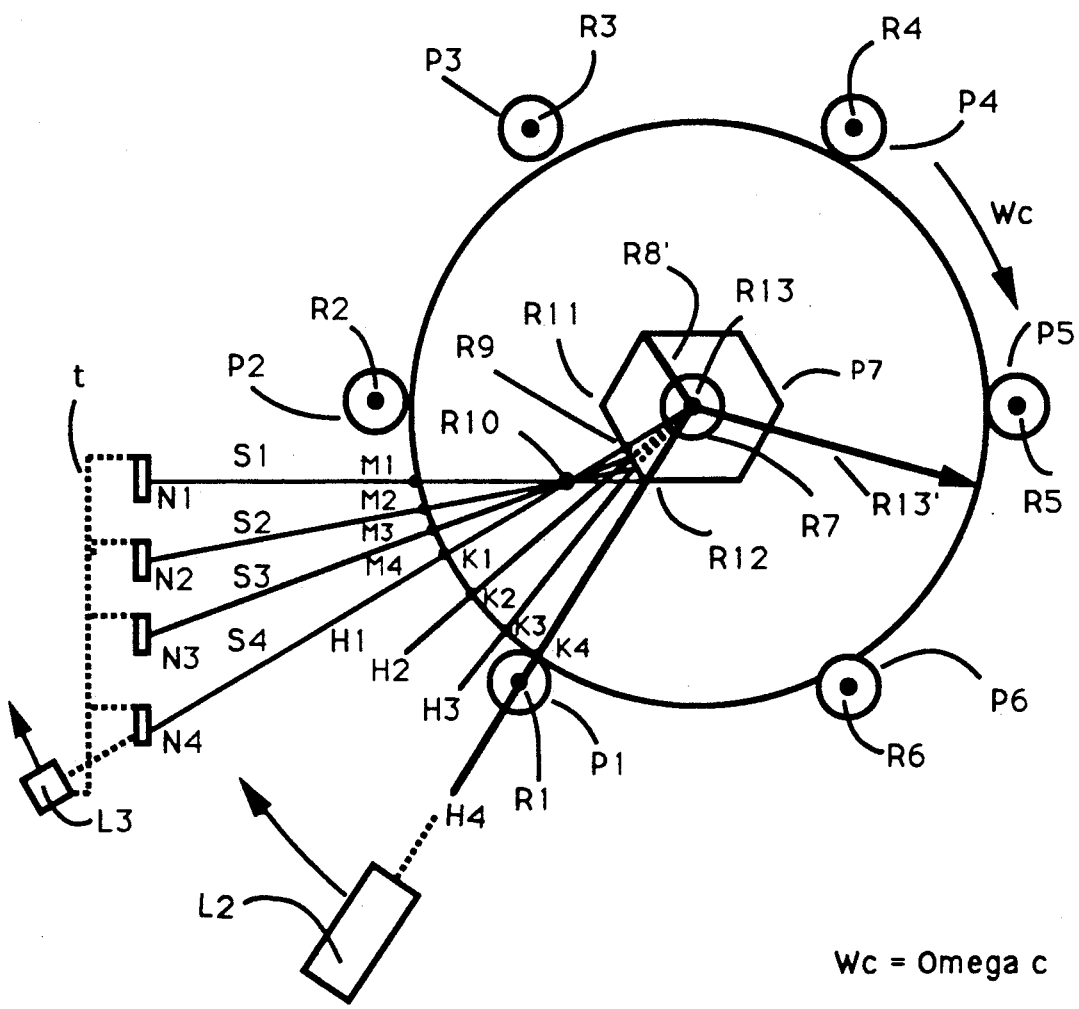
FIG. 2 (a) is a diagram showing a non-linear tracking system using a regular polygon in accordance with the invention.
Figure 2B:
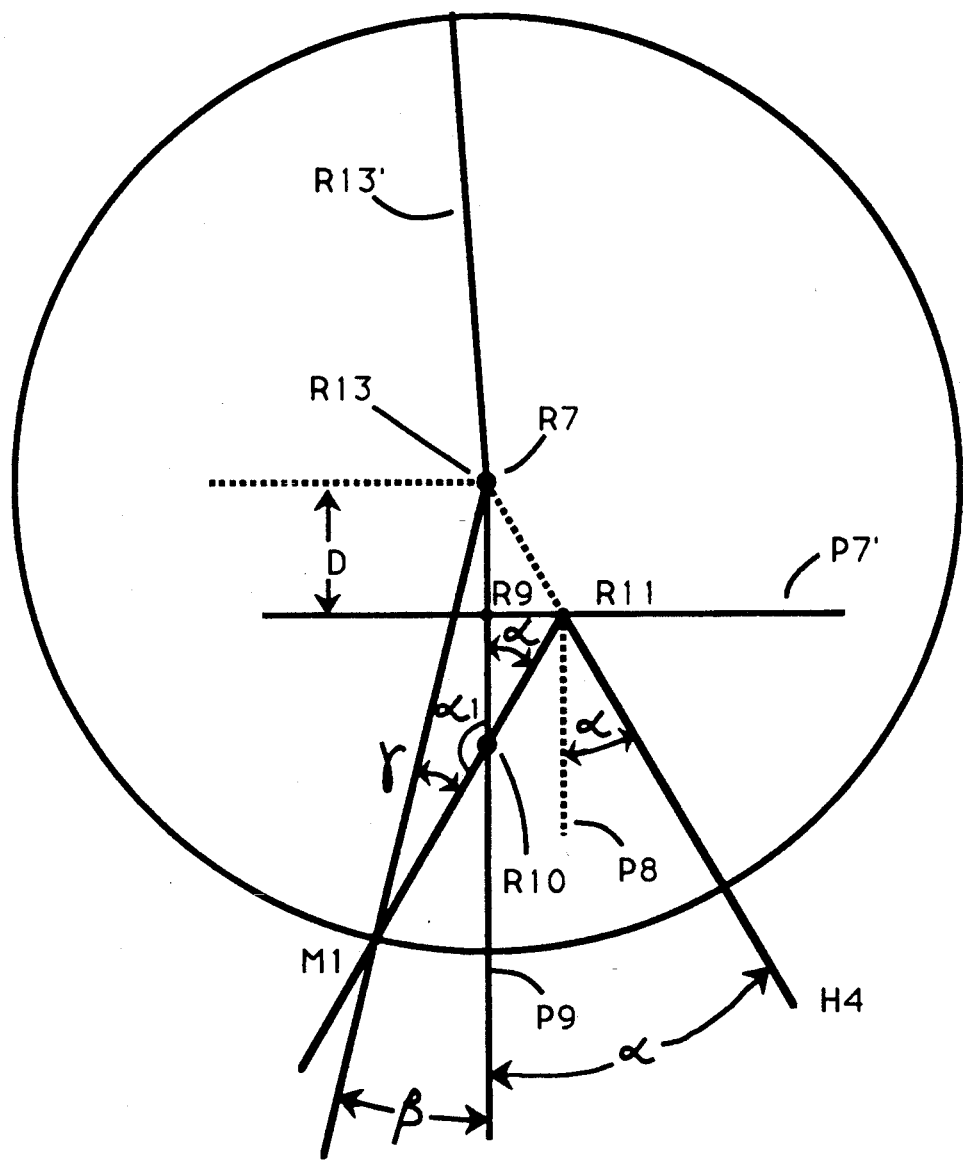

FIG. 2 (a)—Non-Linearity Overcome By Using Polygon and Sensors

FIG. 1 (a) shows, in accordance with the invention, sensors N1 to N4 which overcome the nonlinearity of the tracking system using a regular polygon P7.

A rotating carousel (not shown) has six object pockets P1 to P6 spaced equally around the carousel and outside the circumference of tracking radius R13', as shown. Polygon P7 is mounted on carousel axis R7 with a center at R13. The axes of the pockets are R1 to R6. The carousel (not shown) and the pockets rotate with an angular velocity omega c, and a laser beam from laser L2 is normally held static (no movement) and aligned towards the polygon's center R13.

Typical physical dimensions of the carousel (not shown) are as follows: diameter 1 m; height 3 m (including the rotating motor and axis support—not shown). The carousel's angular velocity is of the order of 100 rpm. The polygon's radius is 50 cm, and its height 5–20 cm.

In order to understand the theory of the invention, imagine that the arrangement shown is reversed, i.e., the carousel is held static and laser L2 is rotated at a constant angular velocity around radial axis R7. The reversing of relative movement of the carousel and the laser beam is mathematically correct and is done to provide an easier way of drawing the figures and an easier understanding of the invention. The laser will thereupon emit beams H1 to H4 spaced equally in time and aligned towards center R13 of the polygon. These beams will intersect the circumference of the tracking radius at points K1 to K4; distances K1-K2, K2-K3, and K3-K4 will be equal.

Laser beam H4 hits facet R11-R12 of the polygon and is reflected as beam S1 which intersects the tracking radius's circumference at a point M1. (Laser L2 will emit its beam when there is no bottle in between it and the polygon's facet, or it can be located higher than the plane of the paper where its beam's projection on the paper's plane will still pass through segment between R13 and R1).

Next, beam H3 is reflected as beam S2, beam H2 is reflected as beam S3, and beam H1 is reflected back on itself as beam S4 since beam H1 is perpendicular to facet R11-R12.

The reflected beams intersect the circumference of the tracking radius at points M1, M2, M3, and M4, respectively; K1 and M4 are the same point.

All of the reflected laser beams from the polygon intersect at a point R10 which is along a radius vector R13-R9-R10 and K1. (Proof is described later in connection FIG. 3). It is clear that distances M1-M2, M2-M3, and M3-M4 are not equal. IN order to be equal in size, they must lie on a circumference of a circle with a center at R10; however they lie on a circumference of a circle with its center at R13.

The results show that the laser beams hit the polygon's facets at equal distances K1-K2, K2-K3, and K3-K4 and are reflected over non-linear distances M1-M2, M2-M3, and M3-M4 which lie on the circumference with radius R13', or on any other circumference having a radius at the center of axis R7.

An object mounted in pocket P1 is thus illuminated by non-linear movements of reflected beams S1 to S4, while it rotates on the carousel and crosses the paths of the laser beams.

One method of overcoming this non-linearity is to reverse the positions of the laser beams hitting the polygon with those reflected from the polygon, i.e., paths S1 to S4 are made input laser beams and H4 to H1 are made reflected laser beams.

In reality we have two system modes, the calibration mode and the operation mode. The calibration mode occurs but once, where sensors N1 to N2 are aligned to sense reference locations M1 to M4. Reference locations M1 to M4 are found by using a first light beam. In the calibration mode, first light beams H1 to H4 are the result of input laser beams hitting the polygon and being reflected as beams S1 to S4 to define reference location marks M1 to M4. In the operation mode, a second set of light beams are used: laser beams S1 to S4 are made the input laser beams and beams H4 to H1 are made the reflected laser beams.

Overcoming non-linearity can be accomplished (for the case shown in FIG. 2 (a)) by using a set of photodetector sensors N1 to N4. That is, each beam can engrave one mark on the rotating surface. The reference locations, i.e., the positions of beams M1 to M4, are detected by sensors N1 to N4. The output of sensor N4 is sent to laser station L3 (connection shown by broken line t) which emits beams S4. The duration of time that beam S4 is on should be very short. This is to prevent "smearing" of the engraved mark on the surface of the object as a result of the spinning movement of the object. Typical values for laser L3 are 100 watts of power, a pulse duration of less than 1 ms, and a 632.8 nm wavelength, which is typical for a helium-neon, "economy" laser. Beam S4 should be emitted as soon as possible or with the same delay for each of the emitted beams. This beam is reflected as beam H1 and marks point K1 on the circumference of tracking radius R13'.

Similarly the output of sensor N3 causes laser station L3 to emit laser beam S3, which is reflected as beam H2, and marks point K2. The output of sensor N2 causes laser station L3 to emit beam S2, which is reflected as beam H3, which marks point K3. Finally the output of sensor N1 causes laser station L3 to emit beam S1 that is reflected as beam H4, which marks point K4.

Thus the laser beams will be emitted at non-linear intervals corresponding to beams S1 to S4 and will be reflected as beams H4 to H1, which in turn correspond to equidistant points K1 to K4 on the circumference of tracking radius R13'. E.g. the original non-linear tracking system composed of polygon P7 is converted to a linear tracking system by the use of sensors.

In reality, since the carousel and not the laser station is rotating, all of sensors N1 to N4 can be replaced by one sensor at the location which senses marks M1 to M4. All of beams S1 to S4 are emitted by one static station and are aligned towards center R13 of the polygon.

The same results can be obtained by simulating sensors N1 to N4 with a computer calculation, i.e., the timings of the outputs of sensors N1 to N4 is mathematically calculated. This calculation will find the right timing for triggering laser L2 to emit beams S1 to S4, which will be reflected as beams H4 to H1. This timing will depend on the carousel's angular velocity, the polygon's angular velocity, and the carousel's and the polygon's radii. The mathematical equations are printed below.

FIG. 2 (b)—Mathematical Calculation Of Non-Linear Timing

FIG. 2 (b) shows, in accordance with the invention, that an incident beam H4 hits facet P7' of the polygon (not shown) with incident angle alpha and is reflected through points R10 and M1 on the tracking circumference with radius R13' and centered at R7. Lines P8 and P9 are perpendicular to facet P7'.

Figure 3:
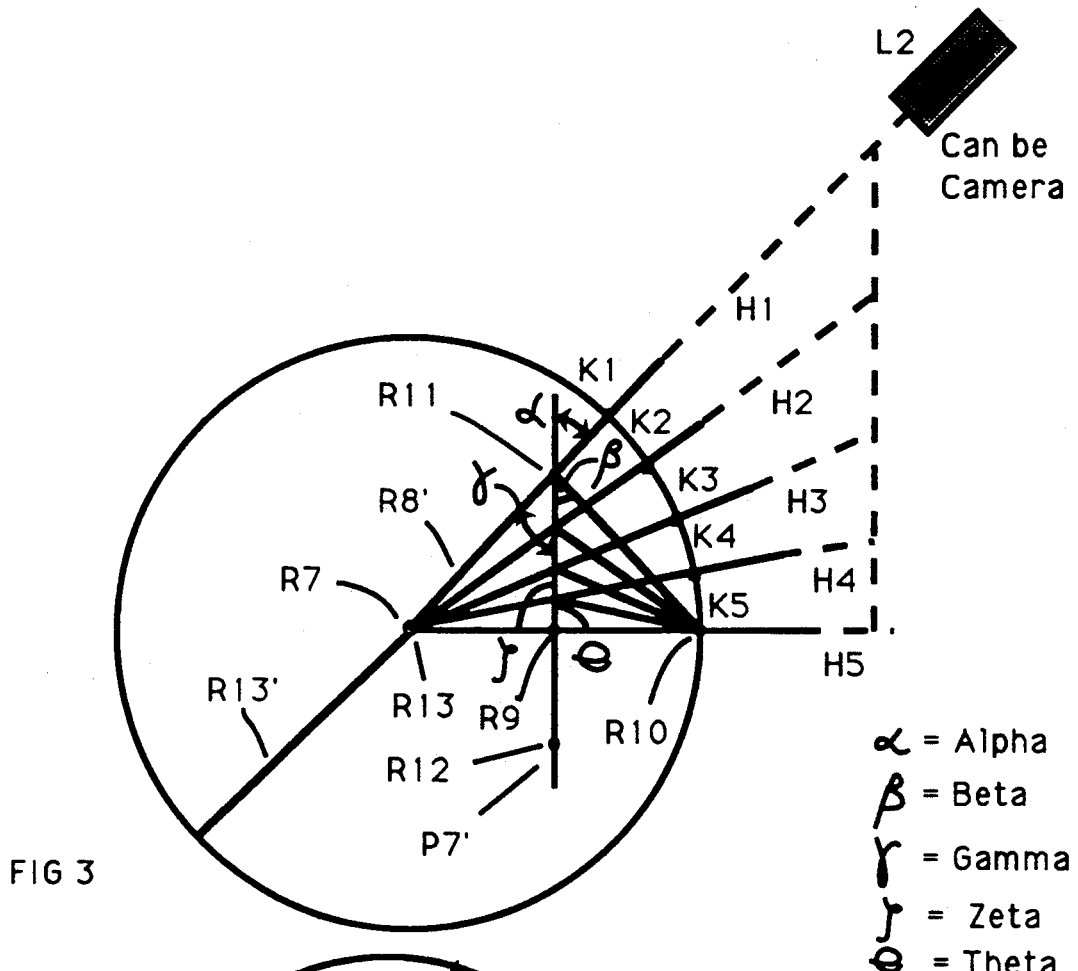
FIG. 3 is a diagram showing a plurality of laser beams reflected from a mirror mounted at a specific location in accordance with the invention.

As shown in FIG. 3 (described infra), distance R13-R9 equals D and also is the same as distance R9-R10. Therefore distance R13-R10=2×D, incident angle alpha is also angle R13-R10-R11, and using the law of complement angles, i.e., alpha+alpha 1=180 and for the triangle M1-R13-R10, alpha 1+gamma+beta=180, the following relationship exists:

$$\text{beta} = \text{alpha} - \text{gamma} \quad (1)$$

Using the law of sines for triangle M1-R13-R10 we get:

$$R13'/\sin(180-\text{alpha}) = 2 \times D/\sin(\text{gamma}) \quad (2)$$

Solving equations (1) and 2 we get:

$$\text{beta} = \text{alpha} - \arcsin\{(2 \times D/R13') \times \sin(180-\text{alpha})\} \quad (3)$$

or $$\text{alpha} = \arctan\{\sin(\text{beta})/(\cos(\text{beta}) - 2 \times D/R13')\} \quad (4)$$

Eq. (3) gives the reflected angle beta as function of incident angle alpha and Eq. (4) alpha as a function of beta. E.g., substituting in Eq. (4) two different values of beta that we would like, the incident beam will be reflected with, say beta 1 and beta 2. Eq. (4) will result in two different values for alpha, say alpha 1 and alpha 2. The difference between the two alphas, alpha 1−alpha 2, is the angle through which the carousel (not shown) rotates between the two emitted laser beams. The time between the two emitted laser beams is (alpha 1−alpha2)/(omega c), where omega c is the angular velocity of the carousel.

FIG. 13—Overcoming Non-Linearity Using A Polygon Of Unique Dimension

FIG. 13 shows a top view of a facet of a unique polygon in accordance with another aspect of the invention. The full polygon (not shown) can have arbitrary numbers of facets, such as P7'. Each of the facets is a rectangular plane mirror of any height. This polygon's dimensions are carefully designed to be in harmony with the whole system, i.e., one of the system parameters is an integral number of times a parameter of the polygon. This polygon is carefully designed to have a special value for its radius R8'. This technique enables focal point R10 to lie on the circumference of the tracking radius R13', i.e., coincident with the surfaces of objects to be engraved.

The center of the carousel (not shown) is at R13; it has a tracking radius vector R13-R10. A facet P7' of a full polygon (not shown) bounded by points R11 and R12 (the same points as in FIG. 2) is mounted at right angle zeta to section R13-R10, at point R9. This point is to be proved as the midsection point of R13-R10, which is also the midsection of engraving radius R13'. Incident laser beams H1 to H4 are aligned towards the center of the carousel (not shown). All of the beams are reflected from facet P7' to a common focal point R10.

Since angle zeta is 90 degrees, angle theta is 90 degrees. Beam H1 hits facet P7' at point R11 with an angle alpha. The reflected angle is beta. Since the reflecting surface is a plane, beta=alpha. From simple geometry angles, alpha=gamma, therefore beta=gamma. In triangle R13-R11-R10, segment R11-R9 is perpendicular to the triangle's base R13-R10 and it also splits top angle at R11. Therefore triangle R13-R9-R11 and the triangle R11-R9 R10 overlap and line R13-R9 is equal to line R9-R10.

This can be repeated for each of beams H2 to H4, or any beam hitting facet P7' that was oriented towards the center axis R7 of the polygon.

The result is that all beams hitting the polygon's facets are focused at point R10 along the radius of the carousel, with distance R9-R10 equal to distance R13-R9. I.e., the harmony of the system's parameters is expressed by making tracking radius R13' an integral number of times (twice) perpendicular R13-R9.

The optical paths are equal to the tracking radius plus distance X of laser L2 from the tracking circumference.

In reality the carousel (not shown) is rotating and laser station L2 is static. Therefore beams H1 to H5 will overlap in space while incident angle alpha will change as a result of rotating the polygon with the carousel. Time-spaced reflected beams H1 to H5 intersect at a fixed focal point R10 on the rotating carousel. Fixed focal point R10 will rotate with the carousel and follow the tracking circumference.

This reverse of movement was done to provide easier way to draw FIG. 3 and to explain the invention. This can be expressed as follows:

$$\text{optical path} = \text{tracking radius} + X \quad (5)$$

X is line segment K1-L2 and is equal for all laser beams H1 to H4. For beam H1, line segment R11-R10 is equal to line segment R13-R11. Line segment R11-K1, plus line segment R11-R10, are equal to tracking radius R13'. This proof is general and can be repeated for any beam hitting the polygon, so long as it is oriented towards its center axis R7.

We have found that if the facets of the polygon are located at one-half the tracking radius, the results are dramatically improved.

At any position where the laser beam hits the polygon (as long as it is aligned towards the center of the polygon), the reflected beams become focused at a single point which lies and moves on a surface of a circumference with radius R13'. I.e., the tracking radius is equal to line segment R13-R10. The engraving circumference is designed to be the location of the engraved surfaces of the objects.

The radius of the polygon, which equals line segment R13-R11, is equal to:

$$\text{polygon radius} = \text{half tracking radius divided by cosine of angle } 180/n \quad (6)$$

where n is the number of pockets on the carousel.

We also see from the drawing that incident beam H1 is reflected from facet P7' at an angle equal to the incident angle. I.e., angle K1-R13-K5 is half angle K1-R11-K5. This is typical for any beam hitting this facet.

The improved linear tracking system also can be used in reverse order, i.e., light emitted from focal point R10 on the carousel hits polygon facets P7' and is reflected from the facet as beams H1 to H4 which aligned towards the center of the carousel. In that case L2 will be a light sensor, such as a camera, and the image obtained would be that of an object placed at R10.

In reality, the carousel (not shown) is rotating and "camera" L2 is static. Therefore beams H1 to H5 will overlap in space while incident angle alpha will change as a result of rotating the polygon with the carousel.

Figure 4:
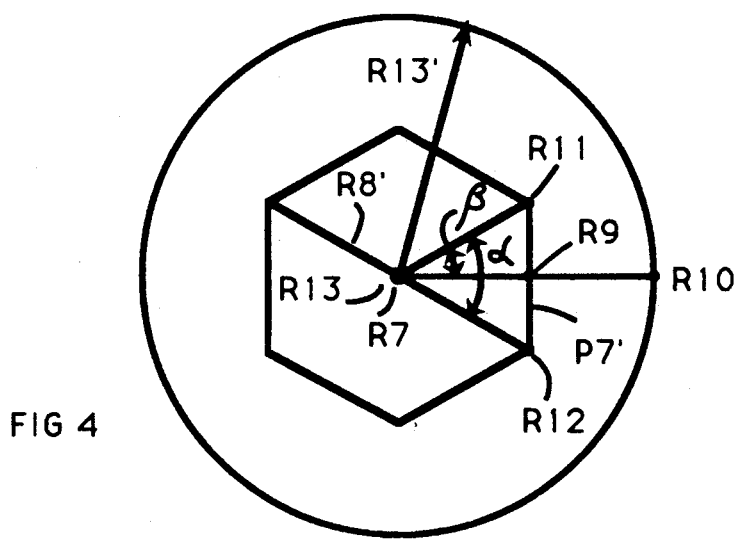
FIG. 4 is a diagram showing a polygon with six facets in accordance with the invention.

FIG. 4—Polygon With Six Facets

FIG. 4 shows a way to design a unique six-faceted polygon. A six faceted polygon can be used for tracking systems with a carousel having six pockets. This is a small number of facets and can be used when there is not a high demand for large throughput. Tracking radius R13' equals line segment R13-R10. This line segment is divided into two equal parts, where R13-R9 is equal to R9-R10. A perpendicular to line segment R13-R10 at point R9 is constructed as facet P7'.

For a six-faceted polygon, alpha equals 60 degrees (360/6), and the value of beta is half of alpha. Therefore beat equals 30 degrees. Beta now creates point R11 on perpendicular P7'. Line segment R13-R11 is radius R8' of the polygon. Facet dimension R11 R12 is a simple trigonometric result. The polygon's facets are rectangular mirrors with a unique size equal to R11-R12, and an arbitrary height (not shown).

Now assume that the six-faceted polygon is mounted on axis R7 of the carousel of FIG. 2 (a). The polygon is rotated with the same angular velocity omega c as the carousel. The objects and pockets P1-P6 rotate at a constant angular velocity omega p, with the objects' surfaces on the engraving circumference. The result is a linear engraving of the object' surfaces by laser L2.

Figure 5:
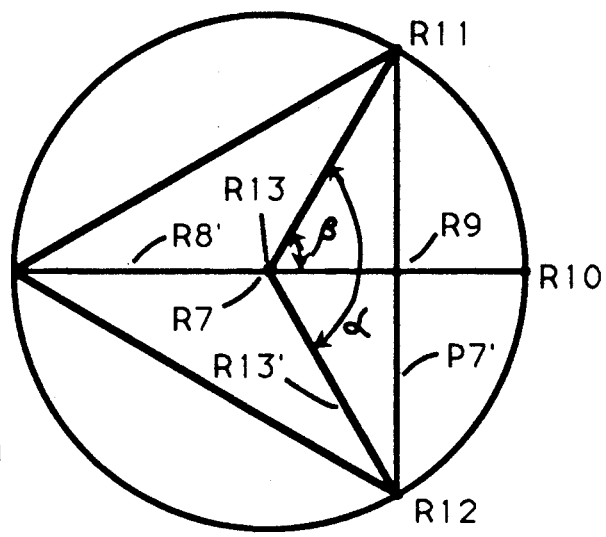
FIG. 5 is a diagram showing a polygon with three facets in accordance with the invention.

FIG. 5—Polygon With Three Facets

FIG. 5 shows a three-faceted polygon. A three-faceted polygon has the fewest sides possible and can be used for tracking systems with a carousel having three pockets. This is a very small number of facets, and can be used with large objects. Tracking radius R13' is equal to the polygon's radius. This is a special case. Most of the time the number of pockets on the carousel is larger than three. This polygon was designed in the same manner as the polygon of FIG. 4 and uses the same notation.

In the polygon of FIG. 5, alpha equals 120 degrees (360/3), and the value of beta is half of alpha or 60 degrees. Beta now creates point R11 on perpendicular P7'. Line segment R13-R11 is radius R8' of the polygon. The polygon's facets are rectangular mirrors with a unique size. Their length is equal to R11-R12 and their height (not indicated) is arbitrary.

As shown in FIG. 4, the three-faceted polygon is mounted on axis R7 of the carousel of FIG. 2 (a). The polygon rotate with the same angular velocity omega c as the carousel. The objects and pockets P1-P6 rotate at a constant angular velocity omega p, with the objects' surfaces on the engraving circumference. The result is a linear engraving of the object' surfaces by laser L2.

Figure 6:
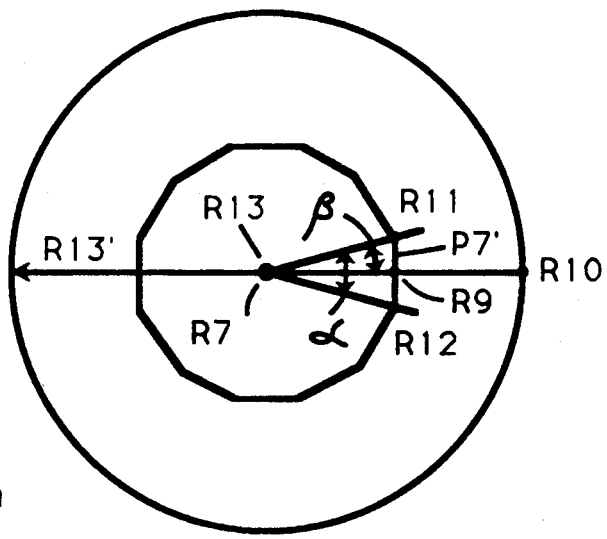
FIG. 6 is a diagram showing a polygon with twelve facets in accordance with the invention.

FIG. 6—Polygon With Twelve Facets

FIG. 6 shows a twelve-faceted polygon. A twelve-faceted polygon can be used in tracking systems with carousels having twelve pockets. This is a recommended number of facets for bottle inspection and will be used when there is a demand for a large throughput. Tracking radius R13' is equal to line segment R13-R10. The polygon is designed in the same manner as FIG. 4 and uses the same notation.

Alpha equals 30 degrees (360/12) and beta is half alpha, or 15 degrees. Beta now creates point R11 on perpendicular P7'. Line segment R13-R11 is the radius of the polygon. The polygon's facets are rectangular mirrors with a unique size. Their length is equal to R11-R12, and their height is arbitrary.

As shown in FIG. 4, the twelve-faceted polygon is mounted on axis R7 of the carousel (not shown) employed in the arrangement of FIG. 2 (a). The polygon rotates with the same angular velocity omega c as the carousel. The objects and pockets P1-P6 rotate at a constant angular velocity omega p, with the objects' surfaces on the engraving circumference of the carousel (not shown). The result is a linear engraving of the object' surfaces by laser L2.

SUMMARY, RAMIFICATIONS, AND SCOPE

The reader will see that, according to the invention, we have provided a tracking system with a unique dimension ratio between the polygon and the tracking radius on the carousel. I.e., the polygon's radius is a unique value equal to one-half the tracking radius divided by cosine of an angle of 180/n, where n is the number of pockets on the carousel. The carousel and polygon move together at a constant angular velocity. The static overlapping hitting beam is oriented towards the center of the polygon and reflected to a fixed focal point on the carousel. The fixed focal point will move on the circumference of the tracking radius linearly, so long as the above conditions are fulfilled. Accordingly, we have shown that the optical path of the engraving beam is constant and is independent of the angular velocity of the carousel-polygon configuration.

In our tracking system the polygon can have arbitrary dimensions. The non-linearity of the system is corrected by the use of a series of sensors that trigger the laser at non-linear intervals to create an effective linear movement of the laser beam on the tracking circumference.

While the above description contains many specificities, these should not be construed as limitations on the scope of the invention, but as exemplifications of the presently preferred embodiments thereof. Many other ramifications and variations are possible within the teachings of the invention. For example the polygon can be produced with a different number of sides, and only part of the polygon need be built. The laser station can be replaced with a source light, and a camera can record the images of the object. The sizes of the polygons, the number of the facets, and the rotational speed can be changed from examples given. The objects do not have to spin on the carousel, i.e., they can have a rotational speed of zero.

Thus the scope of the invention should be determined by the appended claims and their legal equivalents, and not be the examples given.

We claim:

1. A scanning system, comprising:
   (a) a polygon having a plurality of planar sides which are symmetric with respect to an axis of rotation of said polygon, said polygon being mounted directly on said axis of rotation,
   (b) each side of said polygon comprising a mirror,
   (c) each mirror facing away from said axis of rotation,
   (d) carousel means comprising a rotatable platform having an axis of rotation, said rotatable platform being arranged to hold at least one object mounted thereon in a position spaced from said axis of rotation, said polygon being mounted on said axis of rotation of said rotatable platform,
   (e) light means for directing an incident light beam toward the center of said polygon so that it impinges upon said polygon at an angle to said axis of rotation of said polygon, and is reflected from said polygon and intersects a fixed point on said carousel, and
   (f) spinning object means for causing an object on said carousel at said position spaced from said axis of rotation of said carousel to have a rotational speed from zero to spinning.

2. The scanning system of claim 1 wherein said polygon has a radius equal to one-half of a tracking radius divided by the cosine of an angle 180/n, where n is an integer, so as to accurately track said spinning object on said carousel.

3. The scanning system of claim 2 wherein said spinning object means is arranged to maintain the rotational speed of said object at zero.

4. The scanning system of claim 3 wherein said light means is arranged to engrave the surface of said object with a code.

5. The scanning system of claim 1, further including a plurality of light sensors and means responsive to said light beam for taking images of said object.

6. The scanning system of claim 1 wherein said polygon has three sides.

7. The scanning system of claim 1 wherein said polygon has six sides.

8. The scanning system of claim 1 wherein said polygon has twelve sides.

9. A scanning system, comprising:
   (a) a polygon having a plurality of planar sides which are symmetric with respect to an axis of rotation of said polygon, said polygon being mounted directly on said axis of rotation,
   (b) each side of said polygon comprising a mirror,
   (c) each mirror facing away from said axis of rotation,
   (d) carousel means comprising a rotatable platform having an axis of rotation, said rotatable platform being arranged to hold at least one object mounted thereon in a position spaced from said axis of rotation, said polygon being mounted on said axis of rotation of said rotatable platform,
   (e) spinning object means for spinning an object on said carousel,
   (f) first light means for directing a first incident light beam at equal time intervals toward the center of said polygon so that it impinges upon said polygon at an angle to said axis and is reflected from said polygon and moves nonlinearly on said carousel for marking a reference location, and
   (g) second light means for directing a second incident light beam at non-equal time intervals toward the center of said polygon so that it impinges upon said polygon at an angle to said axis of rotation of said polygon, and is reflected from said polygon and moves linearly on said carousel.

10. The scanning system of claim 9, further including a plurality of light sensors and means responsive to said second light beam for taking images of said object.

11. The scanning system of claim 9 wherein said spinning object means is arranged to maintain the rotational speed of said object at zero.

12. The scanning system of claim 9 wherein said second light means is arranged to engrave the surface of said object with a code.

13. The scanning system of claim 9, further including a plurality of sensors at a plurality of reference locations and means responsive to an output of said sensors for controlling said second light means.

14. The scanning system of claim 9, further including means for analytically evaluating intervals of time for causing said second incident beam to move linearly on said carousel.

15. The scanning system of claim 9 wherein said polygon has three sides.

16. The scanning system of claim 9 wherein said polygon has six sides.

17. The scanning system of claim 9 wherein said polygon has twelve sides.

* * * * *

UNITED STATES PATENT AND TRADEMARK OFFICE
CERTIFICATE OF CORRECTION

PATENT NO. : 5,177,632
DATED : Jan. 5, 1993
INVENTOR(S) : N. Schwartz, et al

It is certified that error appears in the above-indentified patent and that said Letters Patent is hereby corrected as shown below:

Col. 2, line 10, change "therefor" to —therefore—.

Col. 4, l. 33, change "IN" to —In—.

Col. 6, l. 20, change "FIG. 13" to —FIG. 3—.

Col. 6, l. 22, change "FIG. 13" to —FIG. 3—.

Col. 8, l. 60, change "object'" to —objects'—.

Col. 8, l. 62-63, change "dimension" to —dimensional—.

Signed and Sealed this

Fifth Day of July, 1994

Attest:

BRUCE LEHMAN

Attesting Officer

Commissioner of Patents and Trademarks